(12) United States Patent
Schuster et al.

(10) Patent No.: US 7,016,675 B1
(45) Date of Patent: Mar. 21, 2006

(54) SYSTEM AND METHOD FOR CONTROLLING TELEPHONE SERVICE USING A WIRELESS PERSONAL INFORMATION DEVICE

(75) Inventors: Guido M. Schuster, Des Plaines, IL (US); Ikhlaq S. Sidhu, Vernon Hills, IL (US); Jerry J. Mahler, Prospect Heights, IL (US); Frederick D. Dean, Chicago, IL (US); Jacek A. Grabiec, Chicago, IL (US)

(73) Assignee: 3Com Corporation, Marlborough, MA (US)

( * ) Notice: Subject to any disclaimer, the term of this patent is extended or adjusted under 35 U.S.C. 154(b) by 0 days.

(21) Appl. No.: 09/406,321

(22) Filed: Sep. 27, 1999

(51) Int. Cl.
*H04Q 7/20* (2006.01)

(52) U.S. Cl. .................. 455/433; 455/552.1; 455/557; 455/556.2

(58) Field of Classification Search ............... 455/435, 455/461, 433, 515, 516, 551, 556, 557, 564, 455/435.1, 556.1, 466; 370/493, 494, 495; 379/211.02, 212.01, 214.01
See application file for complete search history.

(56) References Cited

U.S. PATENT DOCUMENTS

| | | | |
|---|---|---|---|
| 4,313,035 A * | 1/1982 | Jordan et al. ........ | 379/211.02 |
| 4,953,198 A | 8/1990 | Daly et al. ................. | 379/61 |
| 4,973,837 A | 11/1990 | Bradbeer | |
| 5,428,663 A | 6/1995 | Grimes et al. | |
| 5,448,623 A | 9/1995 | Wiedeman et al. | |
| 5,471,616 A | 11/1995 | Johnson et al. | |
| 5,497,339 A | 3/1996 | Bernard .................. | 364/705.05 |
| 5,557,658 A | 9/1996 | Gregorek et al. .......... | 379/67 |
| 5,563,937 A | 10/1996 | Bruno et al. | |
| 5,606,594 A | 2/1997 | Register et al. ............ | 379/58 |
| 5,646,945 A | 7/1997 | Bergler | |
| 5,727,057 A | 3/1998 | Emery et al. ............ | 379/211 |
| 5,732,074 A | 3/1998 | Spaur et al. | |
| 5,732,216 A | 3/1998 | Logan et al. | |
| 5,742,905 A | 4/1998 | Pepe et al. ................. | 455/461 |
| 5,838,665 A | 11/1998 | Kahn et al. ............... | 370/260 |
| 5,850,433 A | 12/1998 | Rondeau .................. | 379/201 |
| 5,875,405 A | 2/1999 | Honda | |
| 5,894,473 A | 4/1999 | Dent | |
| 5,894,595 A | 4/1999 | Foladare et al. ........... | 455/414 |

(Continued)

FOREIGN PATENT DOCUMENTS

DE    198 13 179 A 1    9/1999

(Continued)

OTHER PUBLICATIONS

3COM SIP Solutions 1.0 benefits brochure. (4 total pages).

(Continued)

*Primary Examiner*—Temica Beamer
(74) *Attorney, Agent, or Firm*—McDonnell Boehnen Hulbert & Berghoff LLP (57) ABSTRACT

A system and method for accessing a data network telephony account using a wireless personal information device (PID). The user may connect over the wireless cellular infrastructure to a telephony control server via a data network for access to the user's telephony account, which indicates the user's telephone number in a telephone number entry. Once the connection is made, the user issues a command to set the telephone number entry in the user's data network telephony account to a specific telephone number. The user may then invoke a contacts application in the wireless PID and select a person to call from the contacts list. The user selects the entry to send a command to initiate a telephone connection between the party selected and the user at the telephone designated by the user at the telephony control server.

5 Claims, 10 Drawing Sheets

U.S. PATENT DOCUMENTS

| | | | |
|---|---|---|---|
| 5,915,008 A | 6/1999 | Dulman | 379/201 |
| 5,918,172 A | 6/1999 | Saunders et al. | |
| 5,930,700 A * | 7/1999 | Pepper et al. | 455/414 |
| 5,933,778 A | 8/1999 | Buhrmann et al. | 455/461 |
| 5,938,757 A | 8/1999 | Bertsch | |
| 5,960,340 A * | 9/1999 | Fuentes | 455/417 |
| 5,963,864 A * | 10/1999 | O'Neil et al. | 455/445 |
| 5,970,059 A | 10/1999 | Ahopelto et al. | |
| 5,991,394 A | 11/1999 | Dezonno et al. | |
| 6,006,272 A | 12/1999 | Aravamudan et al. | |
| 6,031,904 A | 2/2000 | An et al. | |
| 6,052,369 A | 4/2000 | Hämäläinen et al. | |
| 6,064,887 A * | 5/2000 | Kallioniemi et al. | 455/445 |
| 6,075,992 A | 6/2000 | Moon et al. | |
| 6,084,584 A | 7/2000 | Nahi et al. | |
| 6,141,341 A | 10/2000 | Jones et al. | |
| 6,161,134 A | 12/2000 | Wang et al. | |
| 6,163,598 A | 12/2000 | Moore | |
| 6,167,040 A | 12/2000 | Haeggstrom | |
| 6,175,860 B1 | 1/2001 | Gaucher | |
| 6,188,688 B1 | 2/2001 | Buskirk, Jr. | |
| 6,212,261 B1 | 4/2001 | Meubus et al. | |
| 6,212,383 B1 * | 4/2001 | Foladare et al. | 455/445 |
| 6,216,158 B1 | 4/2001 | Luo et al. | |
| 6,240,097 B1 | 5/2001 | Weslock et al. | |
| 6,266,539 B1 | 7/2001 | Pardo | |
| 6,301,609 B1 | 10/2001 | Aravamudan et al. | |
| 6,308,201 B1 | 10/2001 | Pivowar et al. | |
| 6,334,126 B1 | 12/2001 | Nagatomo et al. | |
| 6,337,858 B1 | 1/2002 | Petty et al. | |
| 6,338,140 B1 * | 1/2002 | Owens et al. | 713/168 |
| 6,359,892 B1 | 3/2002 | Szlam et al. | |
| 6,373,930 B1 * | 4/2002 | McConnell et al. | 379/114.28 |
| 6,385,308 B1 | 5/2002 | Cohen et al. | |
| 6,393,274 B1 * | 5/2002 | Peltonen | 455/414.1 |
| 6,404,764 B1 | 6/2002 | Jones et al. | |
| 6,411,965 B1 | 6/2002 | Klug | |
| 6,414,962 B1 | 7/2002 | Hall et al. | |
| 6,418,198 B1 | 7/2002 | Brablec et al. | |
| 6,421,235 B1 | 7/2002 | Ditzik | |
| 6,445,697 B1 | 9/2002 | Fenton | |
| 6,448,978 B1 | 9/2002 | Salvador et al. | |
| 6,449,479 B1 * | 9/2002 | Sanchez | 455/433 |
| 6,456,594 B1 | 9/2002 | Kaplan et al. | |
| 6,456,601 B1 | 9/2002 | Kozdon et al. | |
| 6,477,565 B1 | 11/2002 | Daswani et al. | |
| 6,477,576 B1 | 11/2002 | Angwin et al. | |
| 6,483,902 B1 | 11/2002 | Stewart et al. | |
| 6,493,338 B1 | 12/2002 | Preston et al. | |
| 6,496,477 B1 | 12/2002 | Perkins et al. | |
| 6,516,202 B1 * | 2/2003 | Hawkins et al. | 455/556.2 |
| 6,526,462 B1 | 2/2003 | Elabd | |
| 6,539,359 B1 | 3/2003 | Ladd et al. | |
| 6,542,733 B1 * | 4/2003 | Dennis | 455/433 |
| 6,721,577 B1 * | 4/2004 | Humes | 455/564 |
| 2001/0022784 A1 | 9/2001 | Menon et al. | |
| 2001/0030950 A1 | 10/2001 | Chen et al. | |

FOREIGN PATENT DOCUMENTS

| | | |
|---|---|---|
| EP | 0 578 374 A1 | 8/1993 |
| EP | 0 704 788 A2 | 4/1996 |
| EP | 0 858 202 A2 | 2/1998 |
| EP | 0 869 688 A2 | 10/1998 |
| EP | 0 918 423 A2 | 10/1998 |
| EP | 0 881 848 A2 | 12/1998 |
| WO | WO95/34985 | 12/1995 |
| WO | WO 97/31492 | 8/1997 |
| WO | WO 97/33421 | 9/1997 |
| WO | WO98/00988 | 1/1998 |
| WO | WO 98/04065 | 1/1998 |
| WO | WO98/10538 | 3/1998 |
| WO | WO 99/45687 | 3/1998 |
| WO | WO 98/16051 | 4/1998 |
| WO | WO98/21911 | 5/1998 |
| WO | WO 98/30008 | 7/1998 |
| WO | WO 98/37665 | 8/1998 |
| WO | WO 99/35802 | 1/1999 |
| WO | WO 99/12365 | 3/1999 |
| WO | WO 99/19988 | 4/1999 |
| WO | WO 01/05078 A2 | 7/2000 |

OTHER PUBLICATIONS

Sidhu, Ikhlaq and Bezaitis, Andrew, Eat or be eaten, www.americasnetwork.com/issues/99issues/991101/991191_eat.htm, printed May 10, 2000. (6 total pages).

Myers, Brad A.; Stiel, Herb; and Gargiulo, Robert, Collaboration Using Multiple PDAs Connected to a PC, Proceedings of the ACM 1998 conference on Computer supported cooperative work, Nov. 14-18, 1998, Seattle, WA. (total 11 pages).

Dalgic, Ismail; Borella, Michael; Dean, Rick; Grabiec, Jacek; Mahler, Jerry; Schuster, Guido; and Sidhu, Ikhlaq, True Number Portability and Advanced Call Screening in a SIP-Based IP Telephony System, *IEEE Communications Magazine*, vol. 37, No. 7, Jul. 1999, pp. 96-101. (8 total pages).

Handley/Schulzrinne/Schooler/Rosenberg, SIP: Session Initiation Protocol, Network Working Group, Request for Comments (RFC) 2543, Mar. 1999. (153 pages).

Handley/Schulzrinne/Schooler/Rosenberg, SIP: Session Initiation Protocol, Internet Engineering Task Force, draft-ietf-sip-rfc2543bis-02.ps. Sep. 4, 2000. (131 pages).

Hansson, Allan et al., *Phone Doubler—A Step Towards Integrated Internet and Telephone Communities*, Ericsson Review, No. 4, 1997, pps. 142-152.

Zellweger, Polle T. et al. *An Overview of the Etherphone System and Its Applications*, Xerox Palo Alto Research Center (Mar. 1988), pps. 160-168, XP 000617541.

Terry, Douglas B. et al. *Managing Stored Voice In the Etherphone System*, Xerox Palo Alto Research Center vol. 1, (Feb. 1988), pps. 3-27, XP 000032477.

Terry, Douglas B. et al. *Managing Stored Voice In the Etherphone System*, Operating Systems Review (SIGOPS), US, ACM Head Quarter, New York, NY. vol. 21, No. ⅘ (Nov. 8, 1987), pps. 103-104, XP 000005196.

International Search Report for PCT Application Serial No. PCT/US00/26618, Dated Feb. 19, 2001.

Pepper, David J. et al., *The Call Manager System: A Platform for Intelligent Telecommunications Services*, Speech Communication, vol. 23, (1997), pps. 129-139.

Dalgic, Ismail et al., *True Number Portability and Advanced Call Screening in a SIP-Based IP Telephony System*, IEEE Communications Magazine, vol. 37, No. 7, (Jul. 1999), pps. 96-101.

International Search Report for PCT Application Serial No. PCT/US00/26094, Dated Jan. 31, 2001.

International Search Report for PCT Application Serial No. PCT/US00/26594, Dated Feb. 6, 2001.

Watanabe, H. et al., *Development of the BTRON-BrainPad*, Proceedings 13th Tron Project International Symposium, Online!, (Dec. 4-7, 1996), pps. 95-103.

Gessler, Stefan et al., *PDAs as Mobile WWW Browsers*, Computer Networks and ISDN Systems, vol. 28, No. 1, (Dec. 1995), pps. 53-59.

International Search Report for PCT Application Serial No. PCT/US00/26650, Dated Feb. 19, 2001.

International Search Report for PCT Application Serial No.

PCT/US00/41020, Dated Feb. 21, 2001.

Anquetil, L.P. et al., *Media Gateway Control Protocol and Voice Over IP Gateways. MGCP and VoIP Gateways Will Offer Seamless Interworking of New VoIP Networks with Today's Telephone Networks*, Electrical Communication, (Apr. 1, 1999), pps. 151-157.

International Search Report for PCT Application Serial No. PCT/US00/26649, Dated Feb. 6, 2001.

U.S. Appl. No. 09/451,388, filed Nov. 30, 1999, Guido M. Schuster et al.

U.S. Appl. No. 09/515,365, filed Feb. 29, 2000, Guido M. Schuster et al.

U.S. Appl. No. 09/406,320, filed Sep. 27, 1999, Guido M. Schuster et al.

U.S. Appl. No. 09/515,797, filed Feb. 29, 2000, Guido M. Schuster et al.

U.S. Appl. No. 09/515,364, filed Feb. 29, 2000, Guido M. Schuster et al.

U.S. Appl. No. 09/405,283, filed Sep. 27, 1999, Guido M. Schuster et al.

U.S. Appl. No. 09/515,798, filed Feb. 29, 2000, Guido M. Schuster et al.

U.S. Appl. No. 09/584,924, filed May 31, 2000, Guido M. Schuster et al.

U.S. Appl. No. 09/515,969, filed Feb. 29, 2000, Guido M. Schuster et al.

U.S. Appl. No. 09/406,322, filed Sep. 27, 1999, Guido M. Schuster et al.

U.S. Appl. No. 09/406,152, filed Sep. 27, 1999, Guido M. Schuster et al.

U.S. Appl. No. 09/405,981, filed Sep. 27, 1999, Guido M. Schuster et al.

U.S. Appl. No. 09/406,128, filed Sep. 27, 1999, Guido M. Schuster et al.

U.S. Appl. No. 09/515,387, filed Feb. 29, 2000, Guido M. Schuster et al.

U.S. Appl. No. 09/515,970, filed Feb. 29, 2000, Guido M. Schuster et al.

U.S. Appl. No. 09/515,796, filed Feb. 29, 2000, Guido M. Schuster et al.

U.S. Appl. No. 09/406,151, filed Sep. 27, 1999, Guido M. Schuster et al.

U.S. Appl. No. 09/406,298, filed Sep. 27, 1999, Guido M. Schuster et al.

U.S. Appl. No. 09/406,066, filed Sep. 27, 1999, Guido M. Schuster et al.

U.S. Appl. No. 09/515,795, filed Feb. 29, 2000, Guido M. Schuster et al.

U.S. Appl. No. 09/516,269, filed Feb. 29, 2000, Guido M. Schuster et al.

U.S. Appl. No. 09/515,366, filed Feb. 29, 2000, Guido M. Schuster et al.

U.S. Appl. No. 09/470,879, filed Dec. 22, 1999, Guido M. Schuster et al.

U.S. Appl. No. 09/707,708, filed Nov. 7, 2000, Guido M. Schuster et al.

U.S. Appl. No. 09/677,077, filed Sep. 29, 2000, Guido M. Schuster et al.

U.S. Appl. No. 09/584,927, filed May 31, 2000, Guido M. Schuster et al.

U.S. Appl. No. 09/726,993, filed Nov. 30, 2000, Guido M. Schuster et al.

U.S. Appl. No. 09/728,833, filed Nov. 30, 2000, Guido M. Schuster et al.

"Understanding Packet Voice Protocols"; The International Engineering Consortium; http://www.iec.org.

* cited by examiner

SYSTEM AND METHOD FOR CONTROLLING TELEPHONE SERVICE USING A WIRELESS PERSONAL INFORMATION DEVICE

BACKGROUND OF THE INVENTION

A. Field of the Invention

This invention relates generally to the field of telecommunication, and more particularly to methods by which a personal information device ("PID") can be used to control a telephone system.

B. Description of Related Art and Advantages of the Present Invention

For many years, telephone service providers on the Public Switched Telephone Network (PSTN) provided their customers nothing more than a telephone line to use to communicate with other subscribers. Over time, telephone service providers have enhanced their service by providing Custom Local Area Signaling Service (CLASS) features to their customers. Similar communication services are provided by a Private Branch Exchange (PBX), which is typically implemented in a nonresidential setting.

The CLASS features permit customer subscribers of the features to tailor their telephone service according to individual needs. Some of the more well-known CLASS features are:

Call blocking: The customer may specify one or more numbers from which he or she does not want to receive calls. A blocked caller will hear a rejection message, while the callee will not receive any indication of the call.

Call return: Returns a call to the most recent caller. If the most recent caller is busy, the returned call may be queued until it can be completed.

Call trace: Allows a customer to trigger a trace of the number of the most recent caller.

Caller ID: The caller's number is automatically displayed during the silence period after the first ring. This feature requires the customer's line to be equipped with a device to read and display the out-of-band signal containing the number.

Caller ID blocking: Allows a caller to block the display of their number in a callee's caller ID device.

Priority ringing: Allows a customer to specify a list of numbers for which, when the customer is called by one of the numbers, the customer will hear a distinctive ring.

Call forwarding: A customer may cause incoming calls to be automatically forwarded to another number for a period of time.

A customer subscriber to a CLASS feature may typically activate and/or de-activate a CLASS feature using "*" directives (e.g., *69 to automatically return a call to the most recent caller). CLASS features may also be implemented with the use of out-of-band data. CLASS feature data is typically transmitted between local Class-5 switches using the Signaling System 7 (SS7).

Local Exchange Carriers (LECs) and other similar organizations maintain CLASS offices that typically contain a database entry for each customer. The database allows specification of the CLASS features a customer has subscribed to, as well as information, such as lists of phone numbers, associated with those features. In some cases, customers may edit these lists on-line via a touch-tone interface. A list of all phone numbers that have originated or terminated a call with each customer is often included in the CLASS office database. For each customer, usually only the most recent number on this list is stored by the local Class-5 switch.

A Private Branch Exchange (PBX), is a stored program switch similar to a Class-5 switch. It is usually used within a medium-to-large-sized business for employee telephony service. Since a PBX is typically operated by a single private organization, there exists a wide variety of PBX services and features. Custom configurations are common, such as integration with intercom and voice mail systems. PBX's typically support their own versions of the CLASS features, as well as other features in addition to those of CLASS. Most PBX features are designed to facilitate business and group communications.

A summary of typical PBX features includes:

Call transfer: An established call may be transferred from one number to another number on the same PBX.

Call forwarding: In addition to CLASS call forwarding, a PBX number can be programmed to automatically transfer a call to another number when the first number does not answer or is busy.

Camp-on queuing: Similar to PSTN call return, a call to a busy number can be queued until the callee can accept it. The caller can hang up their phone and the PBX will ring them when the callee answers.

Conference calling: Two or more parties can be connected to one another by dialing into a conference bridge number.

Call parking: An established call at one number can be put on hold and then reestablished from another number. This is useful when call transfer is not warranted.

Executive override: A privileged individual can break into an established call. After a warning tone to the two participants, the call becomes a three-way call.

While the CLASS and PBX features have enhanced the offerings of service providers that use the PSTN, the features are nevertheless limited in their flexibility and scope. The effect to the user is that the features become clumsy and difficult to use. For example, in order to use the Call Forwarding function, the user must perform the steps at the user's own phone prior to moving to the location of the telephone to which calls will be forwarded. A more desirable approach, from the standpoint of usefulness to the user, would be to perform the steps at the telephone to which calls will be forwarded.

Much of the lack of flexibility of the PSTN features is due to the lack of flexibility in the PSTN system itself. One problem with the PSTN is that the terminal devices (e.g. telephones) lack intelligence and operate as "dumb" terminals on a network having the intelligence in central offices. Most PSTN telephones are limited in functional capability to converting the analog signals they receive to sound and converting the sound from the handset to analog signals.

Some PSTN telephones have a display device and a display function to display specific information communicated from intelligent agents in the PSTN network using the PSTN signaling architecture. For example, some PSTN telephones have a display function to enable the Caller ID feature. Even such PSTN telephones are limited however by the closed PSTN signaling architecture, which prohibits access by the PSTN telephones to the network signaling protocols. The display functions are effectively limited to displaying text, again, as a "dumb" terminal.

The Internet presents a possible solution for distributing intelligence to telephony terminal devices. In Internet telephony, digitized voice is treated as data and transmitted across a digital data network between a telephone calls' participants. One form of Internet telephony uses a telephony gateway/terminal where IP telephony calls are terminated on the network. PSTN telephones are connected by a subscriber line to the gateway/terminal at the local exchange, or at the nearest central office. This form of Internet telephony provides substantial cost savings for users. Because the PSTN portion used in Internet telephony calls is limited to the local lines on each end of the call, long distance calls may be made for essentially the cost of a local call.

It is presently contemplated that Internet service providers with a Point of Presence on the Internet will be suitable entities to offer Internet telephony services. The devices that are used by most Internet service providers for Internet access are known as Network Access Servers or Remote Access Servers. These products are commercially available from 3Com Corporation and other telecommunications equipment manufacturers such as Ascend Communications, Lucent Technologies (successor to Livingston Enterprises), and Multitech.

A representative Network Access Server is the Total Control Enterprise Network Hub from 3Com Corporation, described in the patent of Dale M. Walsh, et al., U.S. Pat. No. 5,597,595, which is fully incorporated by reference herein. This device further includes a plurality of digital modems to perform signal conversions on the data from the telephone line channels and a bus network connecting the modems to a network interface card or module. The network interface couples the device to a local or wide are network, such as the Internet service provider backbone network of the Internet, network Access Servers are particularly suited for use in Internet telephony, as they can be configured with software to perform the functions of a Gateway or terminal, as defined by the relevant ITU-T H.323 and H.225 specifications. This is particularly so if the device is configured with a general purpose computing platform (such as the EdgeServer card of the Total Control Network Access Server), as described in the pending patent application of William Verthein, Daniel L. Schoo and Todd Landry, Ser. No. 08/813,173, also incorporated by reference herein.

Notwithstanding the costs savings provided by this form of Internet telephony, it is no more flexible than the PSTN with respect to providing enhancements and features to the basic telephone service.

In another form of Internet telephony, telephones are connected to access networks that access the Internet using a router. The telephones in this form of Internet telephony may be substantially more intelligent than typical PSTN telephones. For example, such a telephone may include substantially the computer resources of a typical personal computer.

It would be desirable to incorporate CLASS and PBX features into a data network telephony system that uses a data network such as the Internet.

It would be desirable to provide new features and enhancements to telephony service that accommodates and conforms to users' needs.

It would also be desirable to provide features and capabilities to telephone service that create new opportunities for users and for service providers.

The present invention addresses the above needs by providing a system in a data network telephony system, such as for example, the Internet, that uses a wireless personal information device (PID) to control the telephony system. A user may configure his or her telephone service by connecting to a telephony control server using the wireless PID. The wireless PID connection to the telephony control server may provide a user with the power to control the behavior of the telephone system to meet the user's needs.

SUMMARY OF THE INVENTION

In a first aspect of the present invention, a personal information device (PID) is provided for controlling telephone service. The PID includes a user interface having a display and a user input device. A user profile includes a telephone number entered by a user. A communications function in the PID establishes a data communications channel over a wireless network to a telephony control server. The telephony control server contains the user's telephony account. An account update function in the PID sends a message over the data communication channel to the telephony control server. The message contains the user profile telephone number and a request to set the user's telephony account telephone number to the user profile telephone number.

In a second aspect of the present invention, a contacts application is added to the PID to display a plurality of contact entries. Each entry includes a contact telephone number. The contacts application includes a function to send the contact telephone number to the telephony control server over the data communications channel with a message to call the contact telephone number.

In a third aspect of the present invention, a telephony control server includes a network interface operable to provide data connectivity with a user accessible over a wireless network. An accounts program accesses a plurality of user accounts. The accounts program may receive a message to set a user telephone number. Each user account contains a telephone number entry, which the accounts program can set to the telephone number entry in response to the message. A connection signaling function in the telephony control server may receive a call message from the user to establish a telephone connection between the user telephone number and a callee telephone number contained in the call message. The connection signaling function initiates a telephone call having at least a portion of the telephone call connected via the data network.

In a fourth aspect of the present invention, a gateway locator is included in the telephony control server to locate a user gateway closest to the user telephone number and to locate a callee gateway closest to the callee telephone number. The telephony control server initiates the portion of the call connected via the data network between the user gateway and the callee gateway.

In a fifth aspect of the present invention, a method is provided for initiating a data network telephone call using a wireless PID with a display. A contacts application is started to display a plurality of contact entries on the display of the PID. One of the contact entries identifying a callee is selected. A data communications channel is initiated to a telephony control server having a user telephone number. A message is sent to the telephony control server to establish the telephone call between the callee and the user by sending a message to call the callee, connecting a telephone call to the user, and connecting the telephone call to the callee.

These and other features and advantages of the present invention will become more apparent from the following detailed description of preferred embodiments of the present invention.

BRIEF DESCRIPTION OF THE DRAWINGS

Presently preferred embodiments of the invention are described below in conjunction with the appended drawing figures, wherein like reference numerals refer to like elements in the various figures, and wherein.

DETAILED DESCRIPTION OF THE PREFERRED EMBODIMENT

The following references to patent applications filed concurrently herewith are incorporated be reference:

"System and Method for Advertising Using Data Network Telephone Connections" to Schuster, et al.

"System and Method for Providing User-Configured Telephone Service in a Data Network Telephony System" to Sidhu, et al.

"System and Method for Accessing a Network Server Using a Portable Information Device Through a Network Based Telecommunication System" to Schuster, et al.

"System and Method for Interconnecting Portable Information Devices Through a Network Based Telecommunication System" to Schuster, et al.

"System and Method for Enabling Encryption on a Telephony Network" to Schuster, et al.

"System and Method for Using a Portable Information Device to Establish a Conference Call on a Telephony Network" to Schuster, et al.

"System and Method for Associating Notes with a Portable Information Device on a Network Telephony Call" to Schuster, et al.

"System and Method for Providing Shared Workspace Services Over a Telephony Network" to Schuster, et al.

"System and Method for Providing Service Provider Configurations for Telephones in a Data Network Telephony System" to Schuster, et al.

The following additional references are also incorporated by reference herein:

"Multiple ISP Support for Data Over Cable Networks" to Ali Akgun, et al.

"Method and System for Provisioning Network Addresses in a Data-Over-Cable System" to Ali Akgun, et al., Ser. No. 09/218,793.

"Network Access Methods, Including Direct Wireless to Internet Access" to Yingchun Xu, et al., Ser. No. 08/887,313

A. Data Network Telephony System

Figure 1:
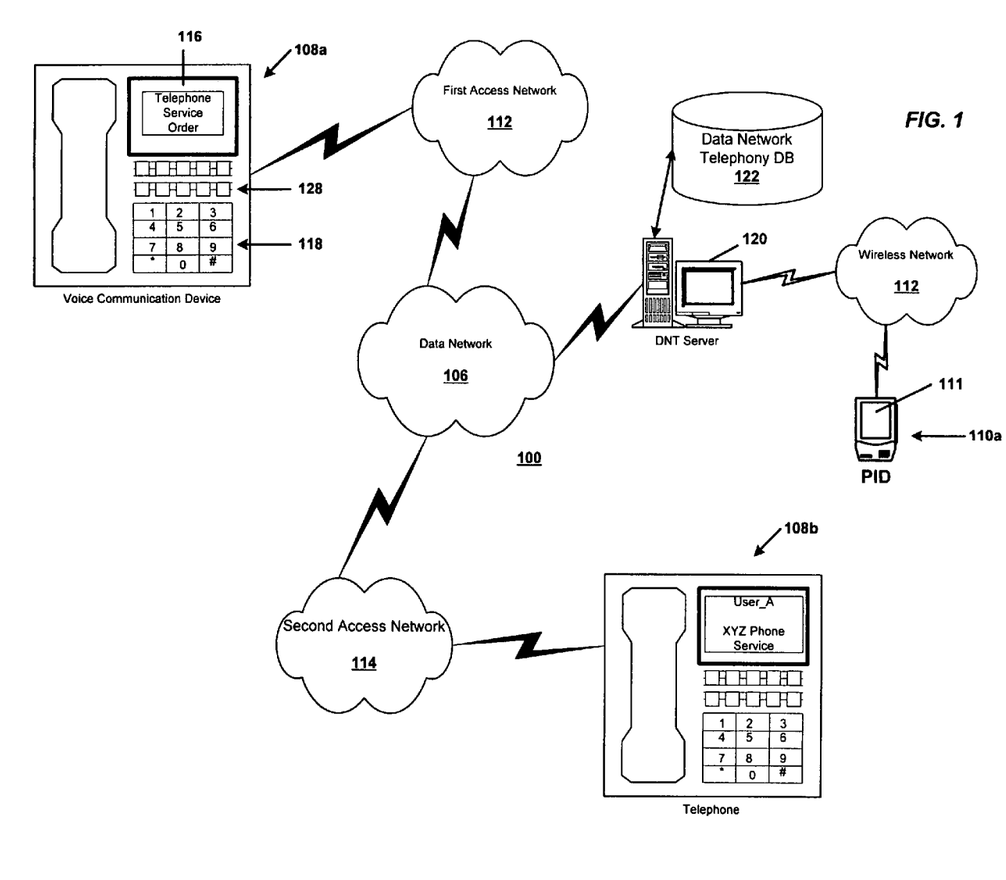
FIG. 1 is block diagram of a data network telephony system for providing advertising services in accordance with embodiments of the present invention.

FIG. 1 is a block diagram showing an example of a system 100 for controlling a telephony system using a wireless personal information device (PID) 110 according to one embodiment of the present invention. The system includes a data network 106. A first voice communication device 108a may communicate by a voice connection over the data network 106 by establishing the connection via first access network 112. The voice connection may be linked to a second voice communication device 108b which is accessed via a second access network 114.

The data network 106 in the system 100 typically includes one or more Local Area Networks (LANs) connected to one another or to a Wide-Area Network (WAN), such as an Internet Protocol (IP) network, to provide wide-scale data connectivity. The data network 106 may use Voice Over Packet (VOP) schemes in which voice signals are carried in data packets. In one embodiment, the data network 106 may include one or more LANs such as Ethernet LANs and support data transport protocols for performing Voice-over-Internet-Protocol (VoIP) techniques on the Internet. For further details regarding VoIP, see the information available through the Internet Engineering Task Force (IETF) at www.ietf.org. In addition, an Internet Telephony gateway may be included within the system 100 to allow for voice connections to users connected by subscriber lines at a PSTN Central Office.

The first and second voice communication devices 108a and 108b may include a direct interface to a data-switched network, such as a LAN. Such voice communications devices 108a,b typically include a voice input, a voice output and a voice processing system. The voice processing system converts voice sound from the voice input to digital data signals that are communicated on a voice connection over the data network. The voice processing system also converts digital data signals received from the voice connection to voice sound at the voice output. The voice communication devices 108a and 108b typically include a central processing unit and memory to store and process computer programs. Each voice communication device 108a and 108b typically includes a unique network address, such as an IP address, in memory to uniquely identify it to data network 106 and permit data packets to be routed to the device.

In one embodiment, the voice communication device 108a includes a handset with a receiver and transmitter similar or identical to handsets of traditional circuit-switched telephones. A console on which the handset sits may include the voice processing system, a display 116 and a keypad 118. The voice communication device 108a may also include a speed dial key set 128 programmed, or assigned to initiate connections to other voice communication devices that may be connected to the data network 106. In a preferred embodiment, the keys on the speed dial key set 128 may be programmed remotely by a message carried on a voice connection using a selected data transport protocol.

One example of the voice communication device 108a in a preferred embodiment is the NBX 100™ communication system phones offered by 3Com® Corporation, that has been modified, as described herein, to perform speed dial programming. In alternative embodiments, the voice communication device 108a may include any device having voice communications capabilities. For example, a personal computer having a microphone input and speaker output may also be used as the voice communication device 108a. Other configurations for the user interface are also intended to be within the scope of the present invention.

The voice communication devices 108a, 108b may also include a typical plain-old telephone set (POTS) currently used for circuit-switched telephony in the Public Switched Telephone Network (PSTN).

The details relating to operation of the voice communication devices 108a and 108b depend on the nature of the data network 106 and the nature of the access networks 112, 114 connecting the voice communication devices 108a and 108b to each other and/or to other network entities. The access networks 112, 114 typically include any high bandwidth network adapted for data communications, i.e. a network having a bandwidth greater than 64,000 bits-per-second (bps). The access networks 112, 114 may link to the voice communication device 108a using an Ethernet LAN, a token ring LAN, a coaxial cable links (e.g. CATV adapted for digital communication), a digital subscriber line (DSL), twisted pair cable, fiberoptic cable, an integrated services digital network (ISDN) link, and wireless links. In embodiments that may not require bandwidth greater than 64,000 bps, the access networks 112, 114 may also include the PSTN and link the voice communications device 108a by a subscriber line.

The system 100 in FIG. 1 shows a telephony control server 120 and an accounts database 122. The telephony control server 120 includes an interface to the data network 106. The purpose of the telephony control server is to provide users of the telephony system with control over their telephony service. Users may subscribe for telephony service from a telephony service provider (e.g. an Internet Service Provider, or ISP). The service provider configures the users' accounts and maintains the accounts in the accounts database 122. The users' account may include information about the user and the user's service provisions. A typical account may include the information shown in Table A.

TABLE A

User Account Information

User identifier: a sequence of alphanumeric elements that uniquely identifies the user.
The user identifier may be formatted as an E.164 telephone number, or as a name.
Telephone Number/Identifier: a sequence of alphanumeric elements that uniquely identifies the telephone used by the user. The user identifier may be formatted as an E.164 telephone number, or as a number, such as a MAC address.
The user's name, address and other information that may be used primarily for billing purposes. For example, the user's checking account number, credit card number or other financial information may be provided for automatic billing and payment capabilities.
User's telephony service features. The user may subscribe, permanently or temporarily, to one or more telephony service features offered by the service provider.
For example:
   Voice mail
   Caller ID
   Call Forwarding with true number portability
   Teleconferencing
Menu of functions displayed at the telephone
Help menu displayed at the telephone
Speed dial key programming (e.g. speed dial to customer service)
Features as standard offerings - to compete, a provider may offer features that normally cost extra (e.g. caller ID, etc.) as standard features
Packaged configurations - Features and offerings may be grouped as distinctly priced packages TABLE A-continued User Account Information Functions using PDA connectivity (e.g. Remote Whiteboard communication, control of telephone use through PDA)

The telephony control server 120 is connected to the data network 106 and configured to allow access by users. For example, users may access the telephony control server 120 by connecting to a web page. The telephony control server 120 may also include functions to initiate telephone calls using a call management protocol and one or more data communications channels. In a preferred embodiment, the user connects to the telephony control server 120 from a wireless personal information device (PID) 110. The preferred wireless PID 110 is the Palm 7 from 3 Com.

The wireless PID 110 includes wireless communications capabilities to permit connections to be made over a wireless network 112. The wireless network 112 preferably includes any cellular telephone network, although other technologies (e.g. infrared, microwave, non-cellular radio, etc.) may be used. The advantage of using cellular radio is that it is widely available.

Figure 2A:
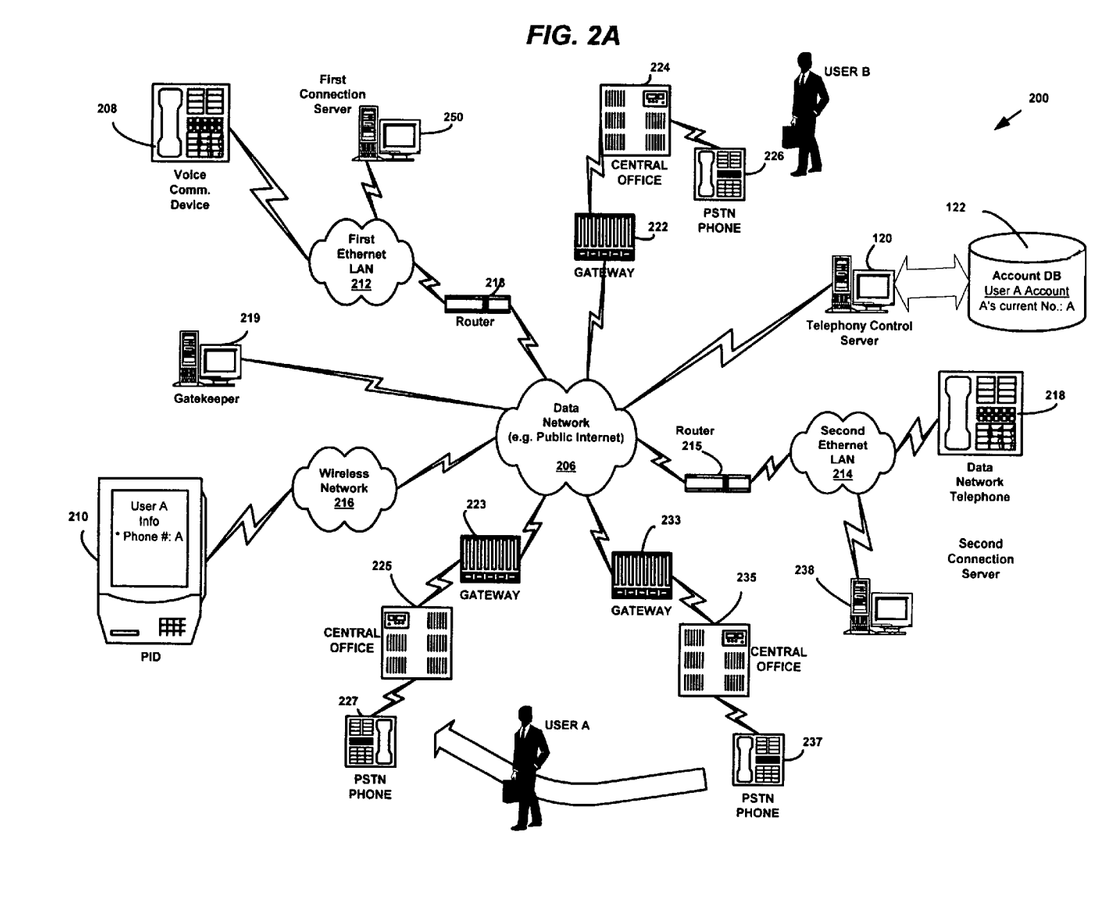
FIG. 2A shows one embodiment of the system of FIG. 1.

One advantage of the system 100 in FIG. 1 is that a user may use the wireless PDA 110 to control telephony service provided to voice communications devices 108a,b that interface directly to data connections (i.e. data network telephones) as well as to voice communications devices 108a,b connected to the PSTN. FIG. 2A shows one embodiment of the system 100 in FIG. 1 that provides a user with the capability of controlling telephone service with a wireless PDA, such as the wireless PDA 110.

The system 200 shown in FIG. 2A shows a data network telephony system that provides voice over data communication for both PSTN telephones and data network telephones. The system 200 includes a data network telephony system that includes a first data network telephone 208 connected to a first local area network 212. The first local area network provides the data network telephone 208 with access to a data network 206 via a router 218. The first local area network 212 also includes a first connection server 250, which uses a call management protocol to provide data network telephony service to the first data network telephone 208 (and other telephones connected to the local area network 212).

The system 200 in FIG. 2A also includes a second local area network 214 to provide data network access to a second data network telephone 218 via a router 215. A second connection server 238 provides call management services for the second data network telephone 218.

In one embodiment, the system shown in FIG. 2A uses the Session Initiation Protocol (SIP) as a call management protocol to establish, maintain and teardown sessions, or telephone calls between users. There are two major architectural elements to SIP: the user agent (UA) and the network server. The UA resides at the SIP end stations, (e.g. the data network telephones), and contains two parts: a user agent client (UAC), which is responsible for issuing SIP requests, and a user agent server (UAS), which responds to such requests. There are three different network server types: a redirect server, a proxy server, and a registrar. The various network server types may be combined into a single server, such as the telephony connection server 250, 238. Not all server types are required to implement the embodiments of the present invention. The communication services to be provided will determine which servers are present in the communication system. Preferred embodiments of the present invention may be carried out using proxy servers.

One example of a SIP operation involves a SIP UAC issuing a request, a SIP proxy server acting as end-user location discovery agent, and a SIP UAS accepting the call. A successful SIP invitation consists of two requests: INVITE followed by ACK. The INVITE message contains a user identifier to identify the callee, a caller user identifier to identify the caller, and a session description that informs the called party what type of media the caller can accept and where it wishes the media data to be sent. User identifiers in SIP requests are known as SIP addresses. SIP addresses are referred to as SIP Uniform Resource Locators (SIP-URLs), which are of the form sip:user@host.domain. Other addressing conventions may also be used.

Redirect servers process an INVITE message by sending back the SIP-URL where the callee is reachable. Proxy servers perform application layer routing of the SIP requests and responses. A proxy server can either be stateful or stateless. A stateful proxy holds information about the call during the entire time the call is up, while a stateless proxy processes a message without saving information contained in the message. Furthermore, proxies can either be forking or non-forking. A forking proxy can, for example, ring several phones at once until somebody takes the call. Registrar servers are used to record the SIP address (called a SIP URL) and the associated IP address. The most common use of a registrar server is for the UAC to notify the registrar where the UAC can be reached for a specified amount of time. When an INVITE request arrives for the SIP URL used in a REGISTER message, the proxy or redirect server forwards the request correctly.

At the first local area network 212, the central registrar/proxy server, such as the telephony connection server 250 is the primary destination of all SIP messages trying to establish a connection with users on the local area network 212. Preferably, the telephony connection server 250 is also the only destination advertised to the SIP clients outside the LAN 212 on behalf of all the SIP clients residing on the LAN 212. The network telephony server 250 relays all SIP INVITE messages to the appropriate final destination (or another SIP proxy), based on a database lookup using a user database (not shown). It allows all mobile clients to register with their current locations.

Similarly, the second telephony connection server 238 is the primary destination of all SIP messages trying to establish a connection with the data network telephone 218 connected to the second local area network 214. Preferably, the second telephony connection server 238 is also the only destination advertised to the SIP clients outside the LAN 214 on behalf of all the SIP clients (e.g. data network telephones) residing on the LAN 214. The second telephony connection server 238 relays all SIP INVITE messages to the appropriate final destination (or another SIP proxy), based on a database lookup using the user database (not shown).

The data network telephones 208 and 218 in the system 200 preferably have pre-programmed device identifiers (e.g. phone numbers), represented as SIP-URL's that are of the form sip:8475551212@3com.com. After power-up, each data network telephones 208, 218 sends a SIP REGISTER message to the default registrar, such as the telephony connection servers 250, 238. When a call arrives at one of the telephony connection servers 250, 238 for any of the registered SIP URLs, the server will forward the call to the appropriate destination. If a data network telephone is moved to a new location, all calls to the associated SIP URL will still be properly routed to that device. The system in FIG. 2A, therefore, provides device mobility in the sense that calls will "follow" the data network telephone according to its SIP URL. This is especially useful if the data network telephone 208, 218 is running the DHCP (Dynamic Host Configuration Protocol) so that when the location is changed, the IP address is also automatically changed.

In one preferred embodiment of the present invention, the wireless PID 210 may send a third party register request directly to the telephony connection server 250, 238. Alternatively, the wireless PID 210 may connect to an application in the telephony control server 120 that may issue a request to one of the data network telephones 208, 218 to register as belonging to the user. The capability to re-register the user's telephone may correspond to a feature offered by a telephony service provider to give a user control over his/her telephone service. When the user is not at his/her telephone, the user may modify a profile of personal information stored in the wireless PID 210 with a telephone number that is nearby. The user may then connect to the telephony control server 120 to change the user's telephone number to that of the nearby telephone.

One advantage of using the telephony control server 120 with the wireless PID 210 is that the user may modify his/her account with the telephone number of any type of telephone.

System 200 in FIG. 2A also shows an alternative arrangement of telecommunications devices that can be used to conduct an IP telephony call. The system 200 includes a first gateway 233, a first central office 235 and a PSTN telephone 237 belonging to a user USER A. A second user, USER B, has a second PSTN telephone 226 connected to a second gateway 222 via a second central office 224. A third PSTN telephone 227 is connected to a third gateway 223 via a third central office 225. This alternative arrangement permits telephone service over the data network 206 using PSTN telephones.

An Internet telephony call from USER A's telephone 237 is transmitted over the Public Switched Provider (ISP) Gateway/Terminal 233. The ITU-T H.225 and H.323 specifications may be used for call management, one of the functions of the Gateway/Terminal 233. The gateway/Terminal 233 may be implemented in a Network Access Server, as described in more detail below.

The Gateway/Terminal 233 provides an interface between the PSTN (typically a time division multiplexed line such as a T1 line) and the data network 206, which is typically a packet switched network such as the Internet or the local ISP backbone network. The Gateway/Terminal 233 routes the call onto the Internet 206, where it is forwarded to a gatekeeper 219 in accordance with the H.323 and H.225 standards. The Gatekeeper 219 may be embodied as a general purpose computer, or as one function performed by an existing piece of telecommunications equipment such as a network access server. The gatekeeper 219 determines where to send the call over the Internet 206 to the proper terminating ISP Gateway/Terminal 222, for example, for the called party. The terminating Gateway/Terminal 222 calls the called party over the PSTN via the central office 224 to USER B's telephone 226. The gateway/terminal 222 facilitates communication between the telephone 226 at the near end with the telephone 237 at the far end.

Figure 2B:
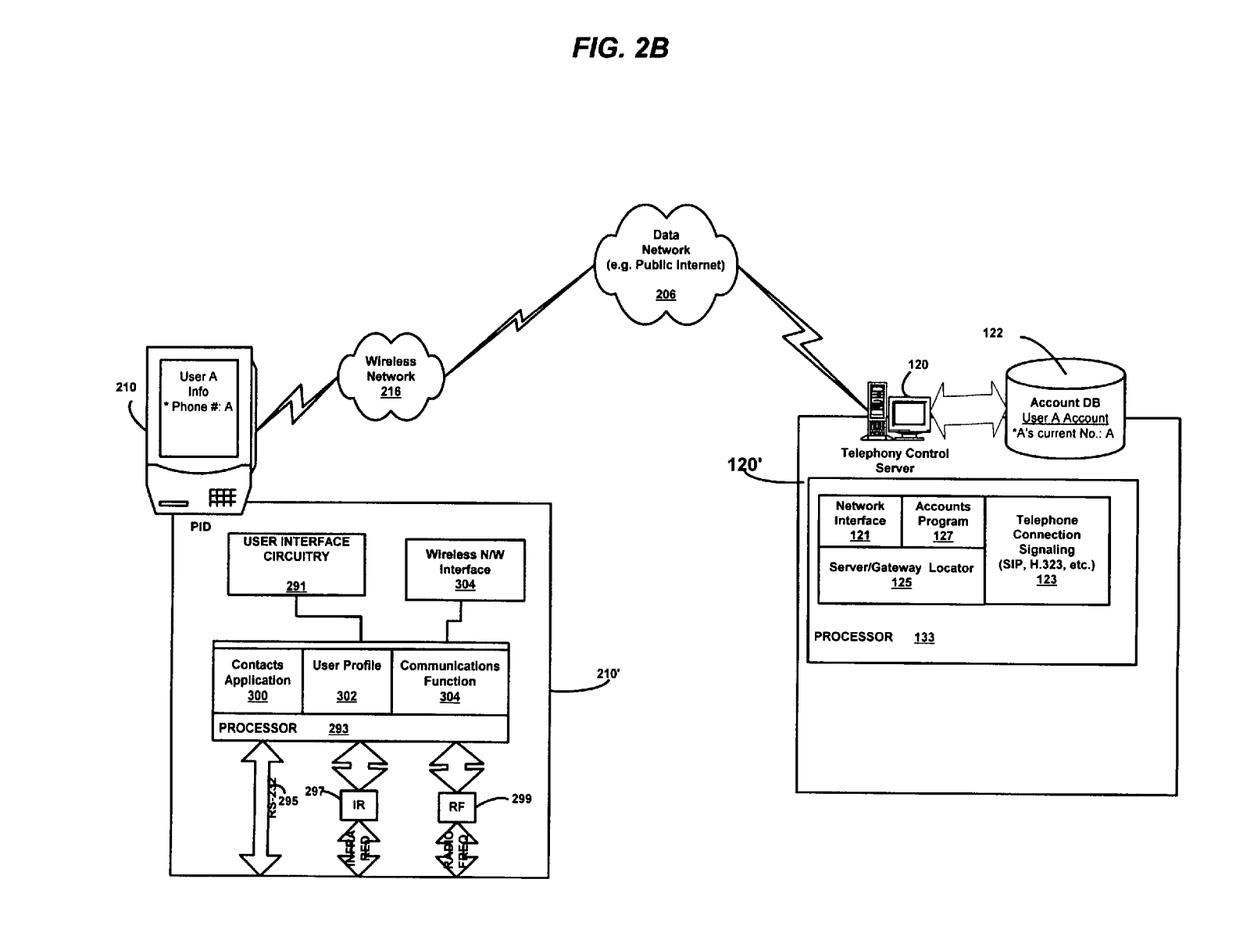
FIG. 2B shows one example of one of the personal information device (PID) in FIG. 2A.

The wireless PID 210 may be used to control telephone service to the PSTN telephones 226, 227, 237. FIG. 2B shows a pictorial and block diagram of one embodiment of the wireless PDA 210 and the telephony control server 120.

The wireless PDA 210 includes (in 210') a user interface circuitry 291, a wireless interface 304, a processor 293 and alternative input/output configurations 295, 297, 299. The user interface circuitry 291 controls the user interface of the wireless PID 210. The user interface of the Wireless PID 210 may include a stylus, buttons, touch sensitive display buttons, the display, etc.

The wireless network interface 304 performs the functions needed to establish a data connection over the wireless network 216. The processor 293 includes a contacts application 300, a user profile 302 and a communications application 304. The contacts application 300 includes any application for a PID (e.g. PDAs) that allows a user to enter information about personal and business contacts.

The user profile 302 stores personal information about the owner of the PID 210. The user profile 302 may include account information about the user's telephone service as well. In one embodiment, the user may enter personal information as a contact in the contacts application 300 and designate the entry as the user profile 302.

The communications function 304 allows a user to initiate a connection to the telephony control server 120 to modify the user's account, or to initiate a telephone call. The communications function 304 may include a program that senses a designated key activation. Upon activation of the designated key, the communications function 304 composes a message to transmit to the telephony control server 120. For example, to initiate a telephone call to a person identified by an entry in the contacts application, the user selects the entry and presses a 'send' screen button to send the request to the telephony control server 120.

The telephony control server 120 in FIG. 2B includes (at 120') a network interface 121, an accounts program 127, a server/gateway locator 125 and a telephone connection signaling function 123. The network interface 121 performs communications functions for communicating on data communications channels in accordance with selected data transport protocols. In a preferred embodiment, the network interface 121 in the telephony control server 120 communicates with the wireless network interface 304 in the PID 210 using a TCP/IP connection. Other protocols and protocol combinations as required by the wireless network infrastructure selected may also be used.

The accounts program 127 performs requests on selected user accounts in the accounts database 122. For example, when the telephony control server 120 receives a request to set a telephone number for selected user, the accounts program 127 retrieves the selected user's account and performs the requested modification.

The telephone connection signaling function 123 performs call management functions to initiate a telephone call between users as requested by the PID 210 user. The telephone connection signaling function 123 may include a signaling stack in accordance with SIP, H.323, MEGACO, MGCP, etc. The signaling stack may support multiple protocols as well.

The server/gateway locator 125 performs location functions for requests to initiate a telephone call. For example, if a PSTN telephone requests to initiate a call to a second PSTN telephone, the server/gateway locator 125 locates the gateway closest to the second PSTN, and if necessary the gateway closest to the first PSTN. The server/gateway locator 125 may include a gatekeeper function, or it may include a function that seeks the gatekeeper 219 shown in FIG. 2A.

Figure 3:
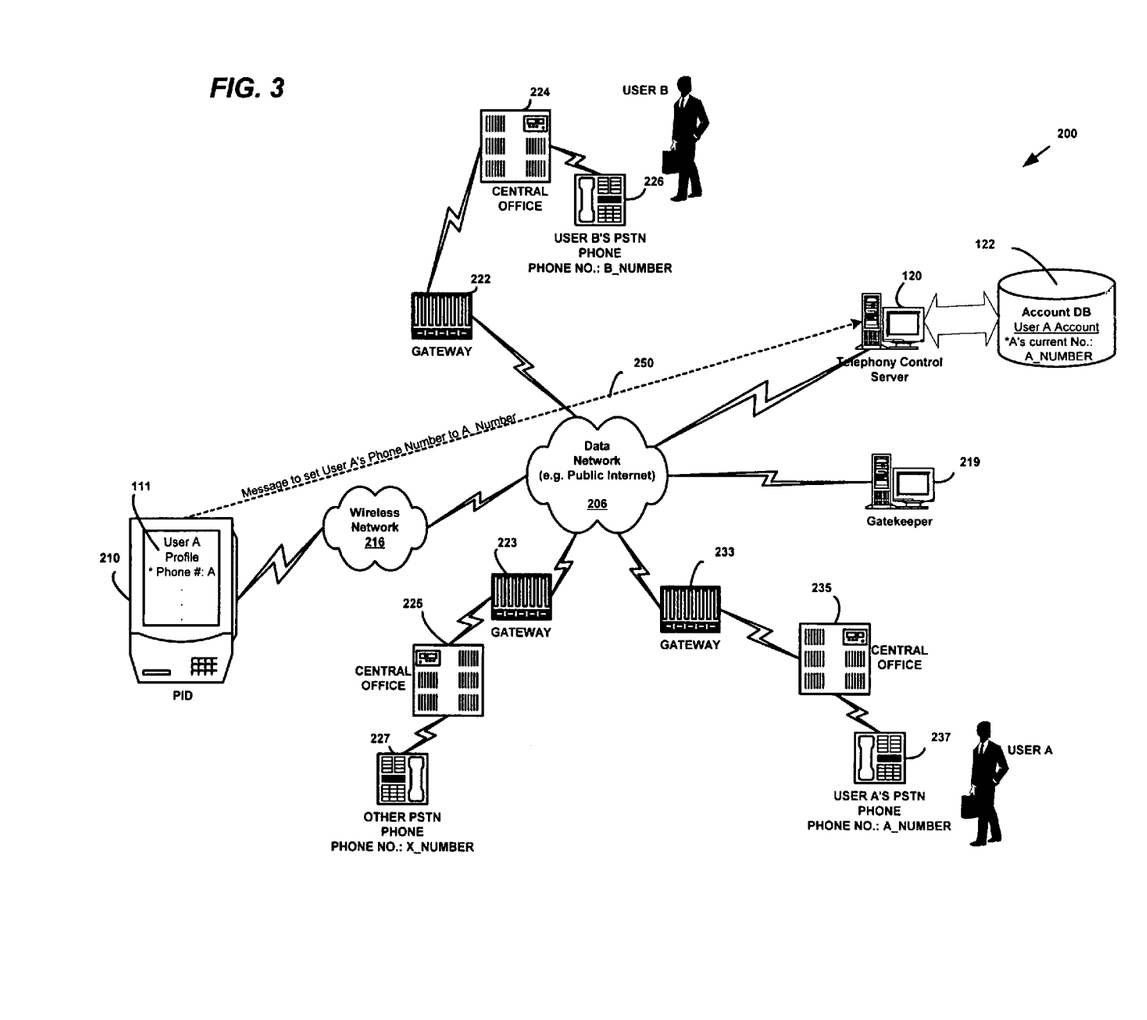
FIG. 3 is a pictorial and block diagram showing one example of a user controlling a telephone system using a wireless PID.

FIG. 3 an example of how the wireless PID 210 may advantageously control user A's telephone service in accordance with one embodiment to the present invention. User A may enter and maintain a profile of personal information in the wireless PID 210, as shown on the display 111. In one embodiment of the present invention, user A may also maintain a similar or identical profile in the telephony control server 120. The telephony control server 120 stores the profile of user A's personal information in the accounts database 122. The profile of user A's personal information may include any type of personal information that user A may wish to store in the wireless PID 210. Preferably, however, user A's profile information includes information about user A's telephone service, such as user A's telephone number. As shown on the display 111, user A has entered A_Number as his phone number. The number A_Number corresponds with the telephone number addressed or identifying user A's telephone 237.

FIG. 3 shows how user A may update his profile of information in the account database 122. User A may update his profile of information in the account database 122 by establishing a data connection 250 with the telephony control server 120. The data connection 250 includes a wireless connection via the wireless network 216 and on the data network 206. In a preferred embodiment, the data connection 250 includes a cellular call over the wireless connection with a TCP/IP channel established between the PID 210 and the telephony control server 120.

Once the data connection 250 is established, the user may use the PID 210 to send a message to set user A's profile in the telephony control server 120 on the data connection 250. As shown in FIG. 3, user A's account in the accounts database 122 shows A's phone number as being A_Number.

Figure 4:
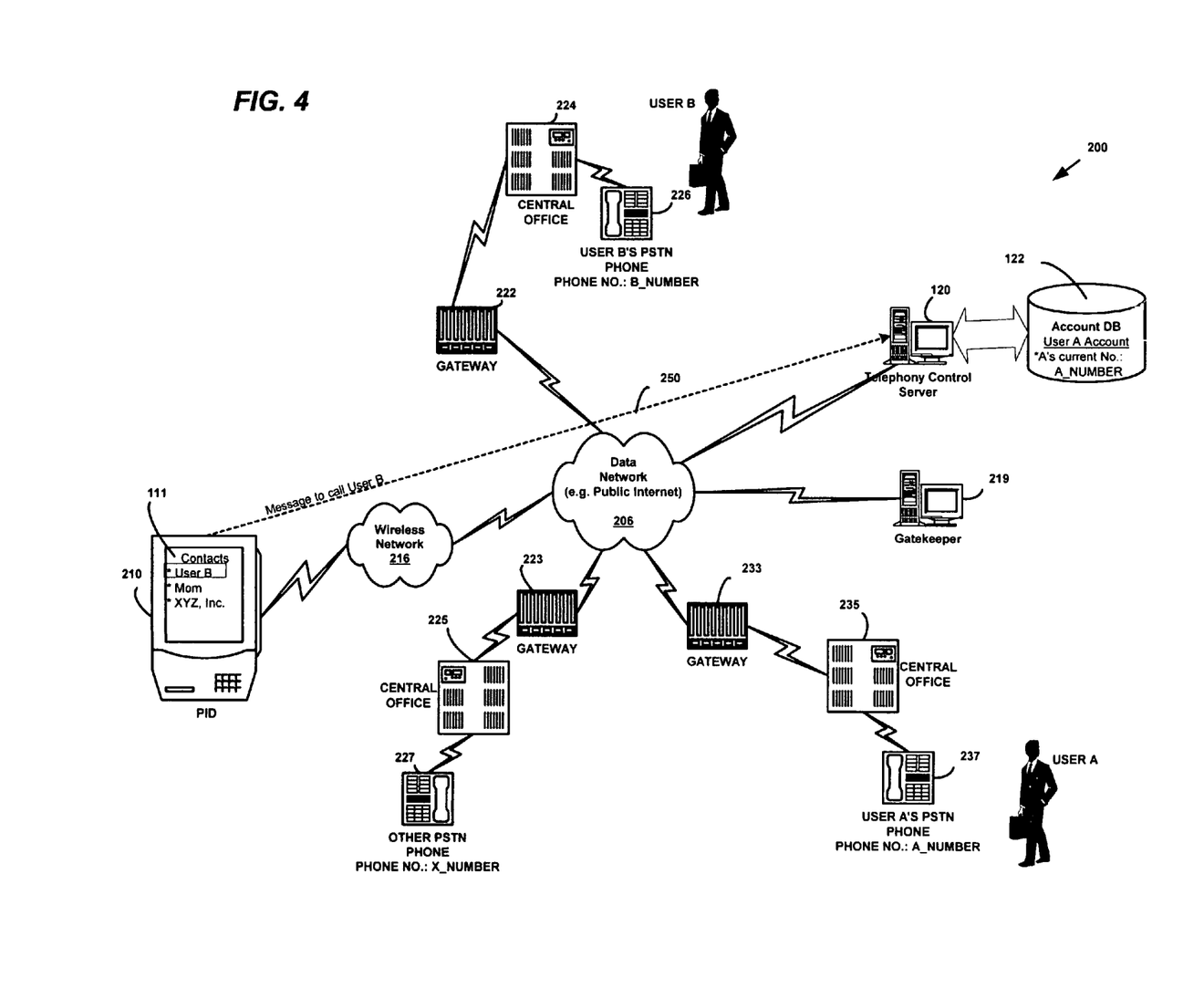
FIG. 4 is a pictorial and block diagram showing another example of a user controlling a telephone system using a wireless PID.

One advantage of having user A's profile of personal information in the accounts database 122 is that the telephony control server 120 may initiate telephone connections L involving user A. Referring to FIG. 4, user A may display a list of user A's contacts on the display 111 using a contacts application (shown in FIG. 2B) in the PID 210. User A's contact list includes an entry for user B. After selecting the entry, the PID 210 may use a data connection that is the same or similar to the data connection 250 of FIG. 3 to send a message to call user B to the telephony control server 120. The telephony control server 120 receives the message and hardware and software components in the server 120 attempt to establish the telephone connection.

Figure 5:
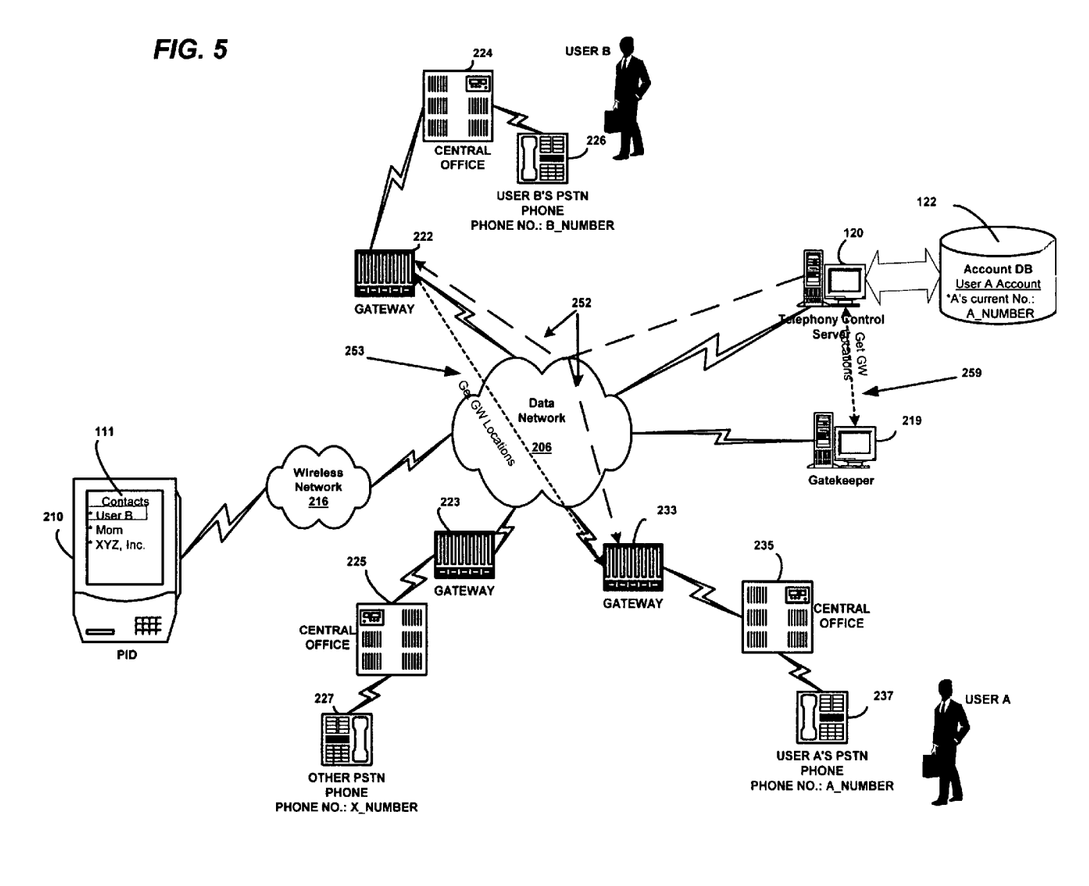
FIG. 5 is a pictorial and block diagram showing another example of a user controlling a telephone system using a wireless PID.

Referring to FIG. 5, the network telephony server 120 sends a signal over a second data connection 252 to user B's gateway 222 and to user A's gateway 233. The two gateways, 222, 233 signal the respective user telephones 227, 226 the respective central offices 224, 225 using well known PSTN signaling methods. The data network telephony server 120 also establishes a third data channel 253 between user A's Gateway 223 and user B's Gateway 222. The third data connection 253 is used to carry digitized voice signals in data packets in accordance with selected network data transport protocols.

The third data channel 253 in FIG. 5 uses UDP over IP to transport the data; and RTP to format voice signals represented as G.711 (but other protocols such as G.723.1) data samples. The specific protocols used, are not important as any suitable protocol may be used for transport and/or data formatting. When user A picks up his telephone 227 and when user B picks up his telephone 226, they may communicate by telephone.

Figure 6:
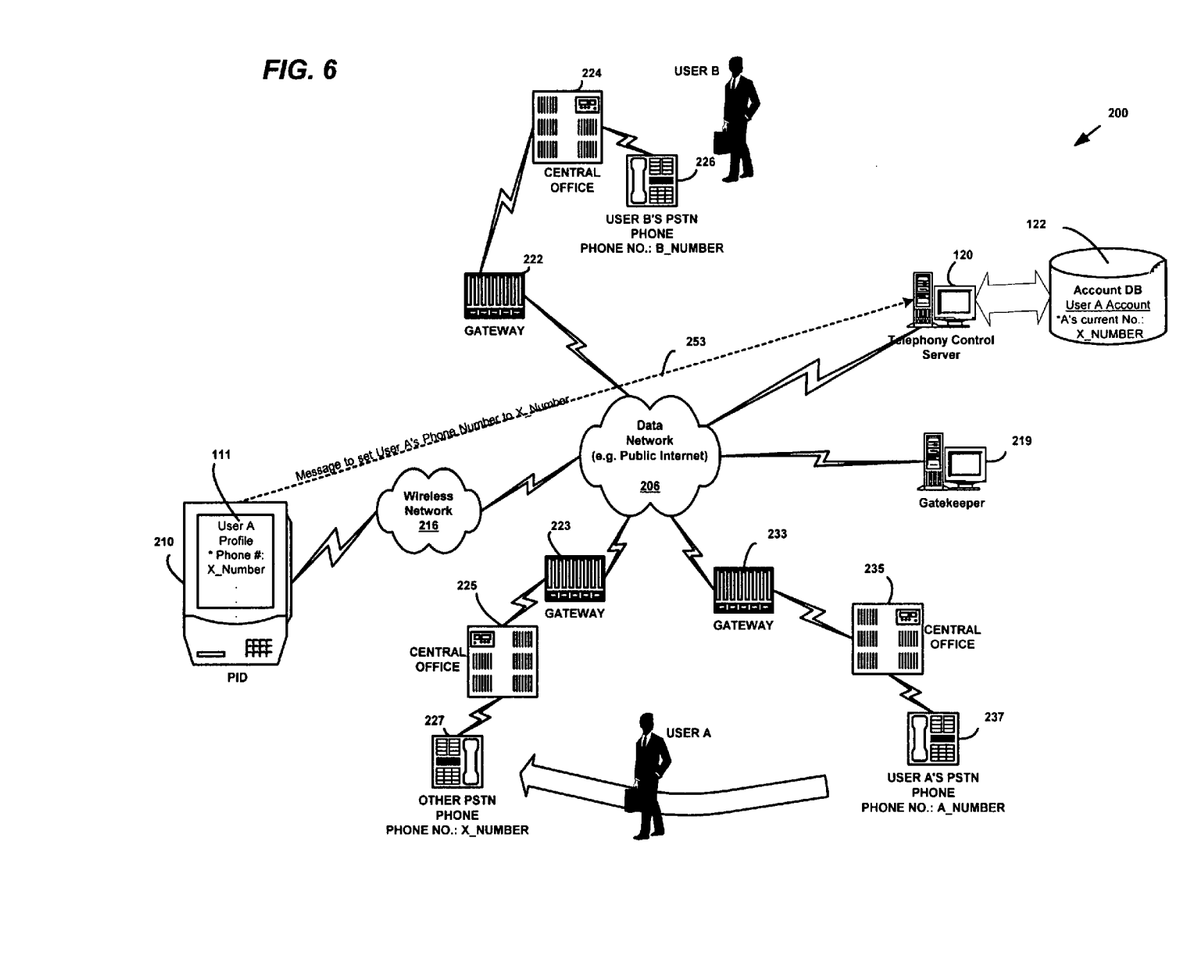
FIG. 6 is a pictorial and block diagram showing another example of a user controlling a telephone system using a wireless PID.

One advantage of using the PID 210 to control the data network telephony server 120 is that the system and methods may be enhanced to provide personal mobility. Referring to FIG. 6, user A may be at a location that is away from user A's telephone227. In addition, user A may be near a third telephone 237. User A may enter the telephone number for the telephone 237 into his profile of personal information on the wireless PID 210, as shown in the display 111. User A may then use the wireless PID 210 to send a message to set user A's phone number to X_Number to the telephony control server 120. The telephony control server 120 receives the message and modifies user A's account in the accounts database 122 to reflect that user A's phone number is now X_Number.

Figure 7:
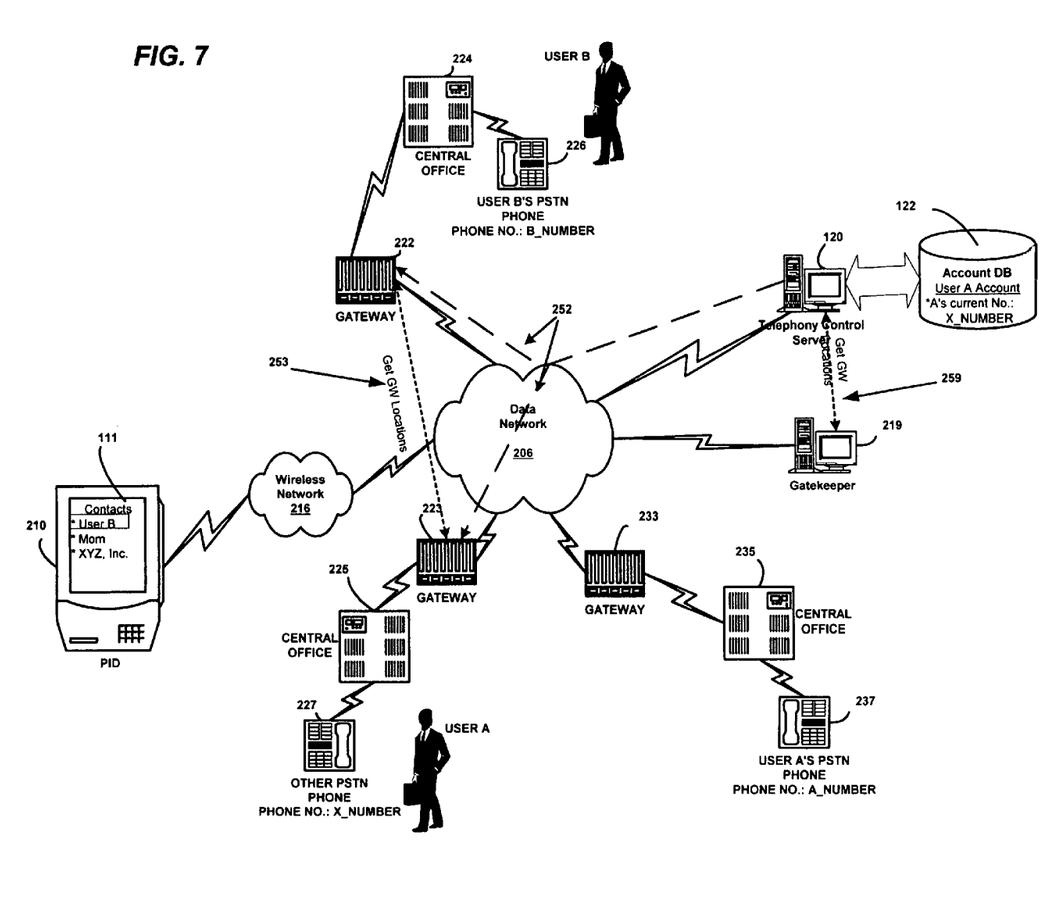
FIG. 7 is a pictorial and block diagram showing another example of a user controlling a telephone system using a wireless PID.

The telephony control server 120 may now divert telephone calls for user A from his original telephone A_Number to the telephone number for the telephone that is closest to him X_Number. Referring to FIG. 7, the user displays user A's contacts on the display 111 of the PID 210. By selecting the "user B" entry, the wireless PID 210 may send a message to caller user B to the telephony control server 120. The telephony control server 120 signals the gateway 223 to call the telephone 227 having the telephone number X_Number. The telephony control server 120 also signals the gateway 222 for user B to call user B's telephone 226. The telephony control server 120 may send a message to the gatekeeper 219 to determine which gateways are closest to usr A's telephone 237 and user B's telephone 226. The telephony control server 120 may have prior knowledge as to the location of the gatekeeper 241, or may send out a gatekeeper request message over the data network 206 to seek a gatekeeper to handle a call.

The gatekeeper 223 places a PSTN telephone call to the telephone 227 closest to user A and having the telephone number X_Number. The gateway 222 places a PSTN telephone call to user B's telephone 226. The gateways 222, 223 also establish a data channel 257 to communicate voice over data packets between the two gateways 222, 223. User A may now speak with user B over the data channel 257.

FIGS. 3 through 7 illustrates systems and methods for controlling telephony service using a wireless PID 210 in accordance with one embodiment of the present invention. The present invention however, is not limited to any system or method shown in FIGS. 3 through 7.

Figure 8:
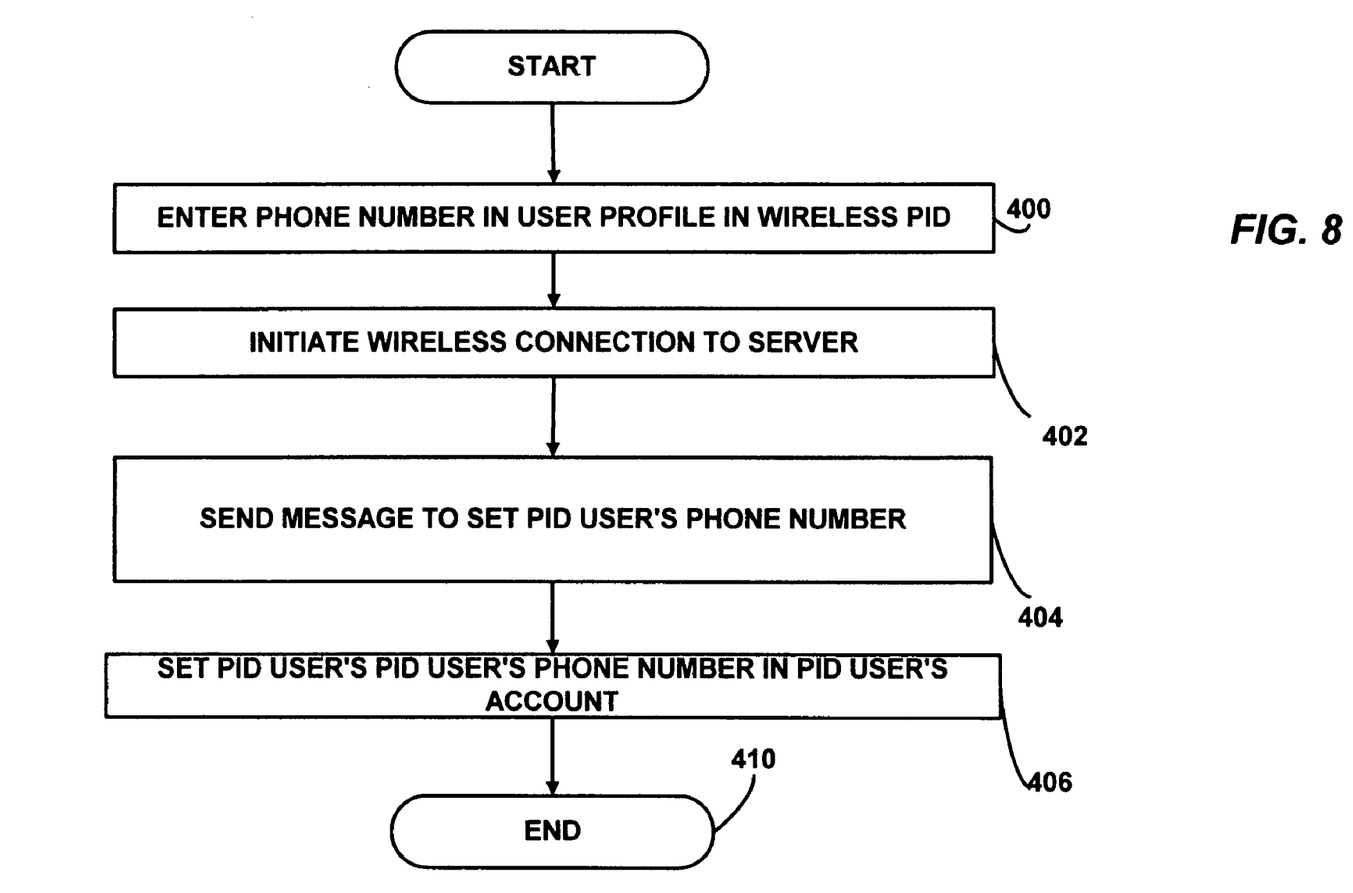
FIG. 8 is a flowchart showing one example of a method for controlling a telephone system with a wireless PID.

FIG. 8 shows a flow chart that illustrates how a user may modify his/her telephony user account in a telephony control server 120 using a wireless PID 210 (both shown in FIG. 2).

At step 400 user enters a telephone number into his/her profile of personal information in the PID 210. At step 402, the user initiates a wireless connection to the telephony control server. The PID 210 sends a message to the telephony control server 120 to set the PID user's telephone number in the user's account to the telephone number contained in the message, as shown in step 404. The telephony control server 120 receives the message at step 406 and retrieves user A's account from the accounts database 122 and modifies user A's telephone number contained in the message.

Once the telephony control server 120 modifies user A's account, telephone calls to user A will be directed to the telephone number in user A's account.

Figure 9:
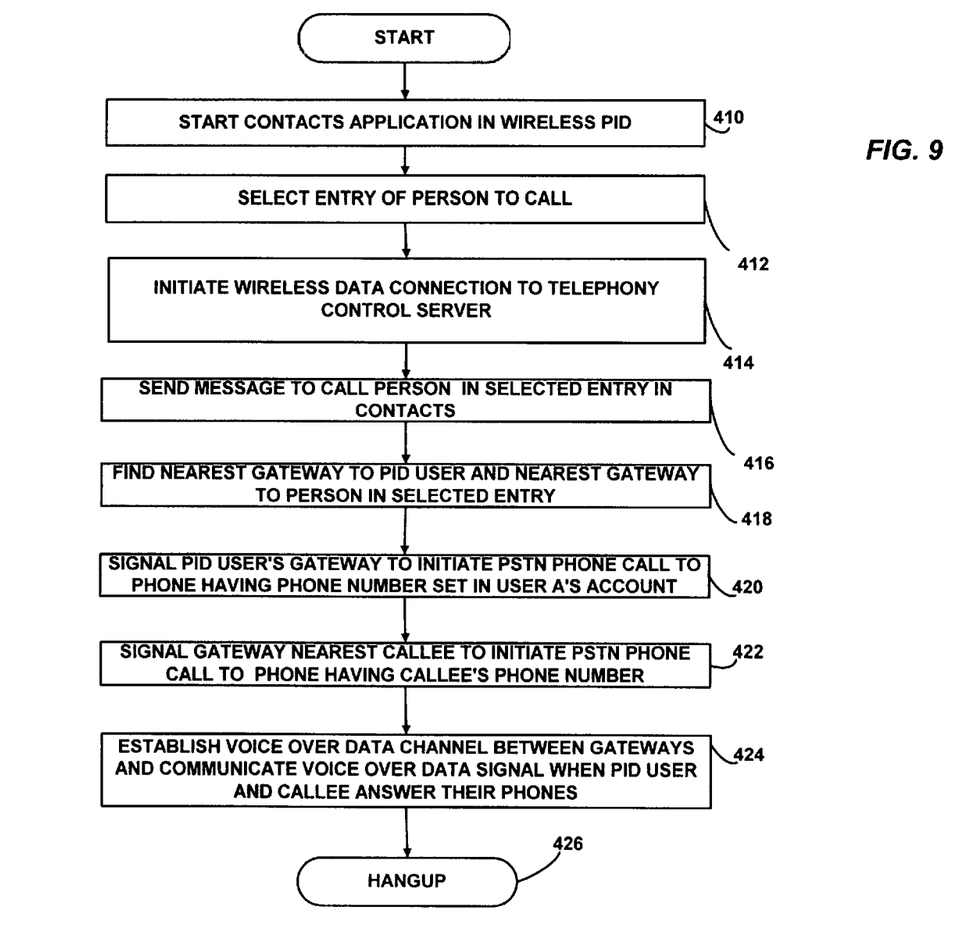
FIG. 9 is a flowchart showing another example of a method for controlling a telephone system with a wireless PID.

FIG. 9 shows an example of a method for initiating a telephone call between two PSTN telephones from the wireless PID 210. Starting at step 410, the user invokes a contacts application in the wireless PID 210 to select an entry for a person that the user wishes to call. At step 412, the user selects an entry and commands the wireless PID 210 to initiate a telephone call. At step 414, the wireless PID 210 initiates a wireless data connection to the telephony control server 120. At step 416, the wireless PID 210 sends a message to call the person whose telephone number is included in the message. At step 418, telephony control server 120 determines the gateway nearest to each party. Once the closest gateway is found, the data network telephony server 120 signals the gateways to make PSTN telephone calls to the telephone identified by the telephone numbers. At step 422, the gateways establish a voice over data channel over the data network. When the users pick up their telephones, the gateways connect their telephones to the voice over data channel so that they may begin conversing as in a normal telephone call.

While the invention has been described in conjunction with presently preferred embodiments of the invention, persons of skill in the art will appreciate that variations may be made without departure from the scope and spirit of the invention. For example, the access networks shown in FIG. 2A may comprise any other suitable type of local area network or service infrastructure.

In addition, protocols of various types are referenced throughout. While preferred and alternative embodiments may implement selected protocols, any suitable replacement protocol not mentioned, or any function not part of a protocol used to replace a corresponding function from a protocol may be implemented without departing from the scope of the invention.

This true scope and spirit is defined by the appended claims, interpreted in light of the foregoing.

We claim:

1. A personal information device (PID) for controlling telephone service comprising:
    a user interface comprising a display and a user input device;
    a user profile having a telephone number entered by a user;
    a communications function to establish a data communications channel over a wireless network to a telephony control server, the telephony control server containing the user's telephony account; and
    an account update function to send a message over the data communication channel to the telephony control server, the message containing the user profile telephone number and a request to set the user's telephony account telephone number to the user profile telephone number.

2. The PID of claim 1 further comprising: a contacts application operable to display a plurality of contact entries, each entry comprising a contact telephone number, the contacts application operable to send the contact telephone number over the data communications channel to the telephony control server with a message to call the contact telephone number.

3. A telephony control server comprising:
    a network interface operable to provide data connectivity with a user accessible via a wireless network;
    an accounts program to access a plurality of user accounts, the accounts program operable to receive a message to set a user telephone number, each user account containing a telephone number entry, the accounts program being operable to set the telephone number entry in response to the message;
    a connection signaling function to receive a call message from the user and to establish a telephone connection between the user telephone number and a callee telephone number contained in the call message; and
    the connection signaling function operable to initiate a telephone call having at least a portion of the telephone call connected via the data network.

4. The telephony control server of claim 3 further comprising:
    a gateway locator to locate a user gateway closest to the user telephone and to locate a callee gateway closest to the callee telephone; wherein the connection signaling function initiates the portion of the call connected via the data network between the user gateway and the callee gateway.

5. A method for modifying a user telephone account having a telephone number entry using a wireless personal information device (PID) connected over a data network, the method comprising the steps of:
    updating a user profile in the wireless PID to a user telephone number; and
    sending a request to set the user telephone account to the user telephone number over a data communications channel to a telephony control server wherein the telephony control server updates the user telephone number entry to the user telephone number.

* * * * *